United States Patent [19]
Silvent

[11] Patent Number: 5,390,554
[45] Date of Patent: Feb. 21, 1995

[54] SPACECRAFT COMPONENT BEARING

[75] Inventor: Edward F. Silvent, Glendale, Ariz.

[73] Assignee: Honeywell Inc., Minneapolis, Minn.

[21] Appl. No.: 783,794

[22] Filed: Oct. 28, 1991

[51] Int. Cl.$^6$ .................. G01C 19/76; F16C 39/00
[52] U.S. Cl. ........................ 74/5.12; 310/90
[58] Field of Search ............. 74/5.1, 5.12; 188/67, 188/378; 244/165; 310/90

[56] References Cited

U.S. PATENT DOCUMENTS

| | | | |
|---|---|---|---|
| 2,959,695 | 11/1960 | Huff | 310/77 |
| 4,182,967 | 1/1980 | Jordan | 310/74 |
| 4,211,452 | 7/1980 | Poubeau | 310/90.5 |
| 4,566,740 | 1/1986 | Beau et al. | 310/74 |
| 4,872,357 | 10/1989 | Vaillant De Guelis et al. | 74/5.1 |
| 5,027,926 | 7/1991 | Cox | 188/67 |

Primary Examiner—David Brown
Attorney, Agent, or Firm—Thomas A. Rendos

[57] ABSTRACT

A spacecraft component bearing unit for resisting axial lead due to launch vibration. This component includes a stator having drive coils, an inertia wheel having a ring magnet, a shaft having a fixed upper bearing cartridge and a floating lower bearing cartridge mounted on the stator and supporting the inertia wheel, three snubber units spaced peripherally at equal angles around an axis of the shaft, and each snubber unit having a piston with a face engaging the shaft and having a bellows connected to the piston for withdrawing the piston from contact with the shaft upon exposure to vacuum pressure at launch completion.

6 Claims, 2 Drawing Sheets

SPACECRAFT COMPONENT BEARING

The invention relates to a spacecraft component bearing and method, and in particular the invention relates to a spacecraft component bearing having an inertia wheel shaft snubber piston with a bellows actuator.

BACKGROUND OF THE INVENTION

The prior art spacecraft component includes a stator having an elongate axis and having coil means, an inertia wheel with a magnet means, a shaft supported by the stator and supporting the inertia wheel, a floating lower bearing cartridge, a fixed upper bearing cartridge, and a pyrotechnic actuated snubber unit.

One problem with the prior art spacecraft component is that, during launch of the spacecraft and component, the fixed upper bearing cartridge may fail due to axial overload caused by vibration. Load normal to the axis is taken by both bearing cartridges. Axial load is taken only by the fixed upper bearing cartridge. Vibration levels are relatively high during launch and are relatively low after burn-out occurs. The ascent pressure decreases, varying from a ground level ambient pressure of 14.7 pounds per square inch to a hard vacuum of space.

Another problem with the prior art spacecraft component is that the pyrotechnic driven snubbber unit creates a substantial amount of debris and generates a shock load environment that can damage the close tolerance bearings as well as the sensitive components in the areas surrounding the pyrotechnic device.

SUMMARY OF THE INVENTION

According to the present invention, a spacecraft component is provided. This component comprises a stator having an elongate axis and having coil means, an inertia wheel with a magnet means, at shaft supported by the stator and supporting the inertial wheel, a first lower floating bearing cartridge, a second fixed upper bearing cartridge, and a bellows actuated snubber unit having a shaft snubbing piston and a piston actuating bellows.

By using the shaft snubbing piston and piston actuating bellows, the problem of vibration overload is avoided and the problem to the bearings of debris from the snubber assembly is avoided.

According to the present invention, a method of absorbing vibration overload on a spacecraft component wheel assembly shift during launch is provided. This method includes the steps of, providing a fixed bearing unit mounted on a stator of the spacecraft component and journaled on a stator shaft coaxially along a common axis, providing a snubber piston slidably mounted on the stator and in engagement with the stator shaft, providing a cover disposed over the fixed bearing unit and snubber piston and joined to the stator, providing a bellows unit mounted over an opening in the cover and subject to a pressure differential between inner and outer sides of the cover, and affixing the piston at its radially outer end to the bellows unit, whereby the decreased pressure exerted on the outer side of the cover and bellows after launch withdraws the piston away from the stator shaft, allowing rotation of the stator shaft relative to the stator and withdrawing support by the piston of the stator shaft.

The foregoing and other objects, features and advantages will be apparent from the following description of the preferred embodiment of the invention as illustrated in the accompanying drawings.

DESCRIPTION OF THE PREFERRED EMBODIMENT

Figure 1:
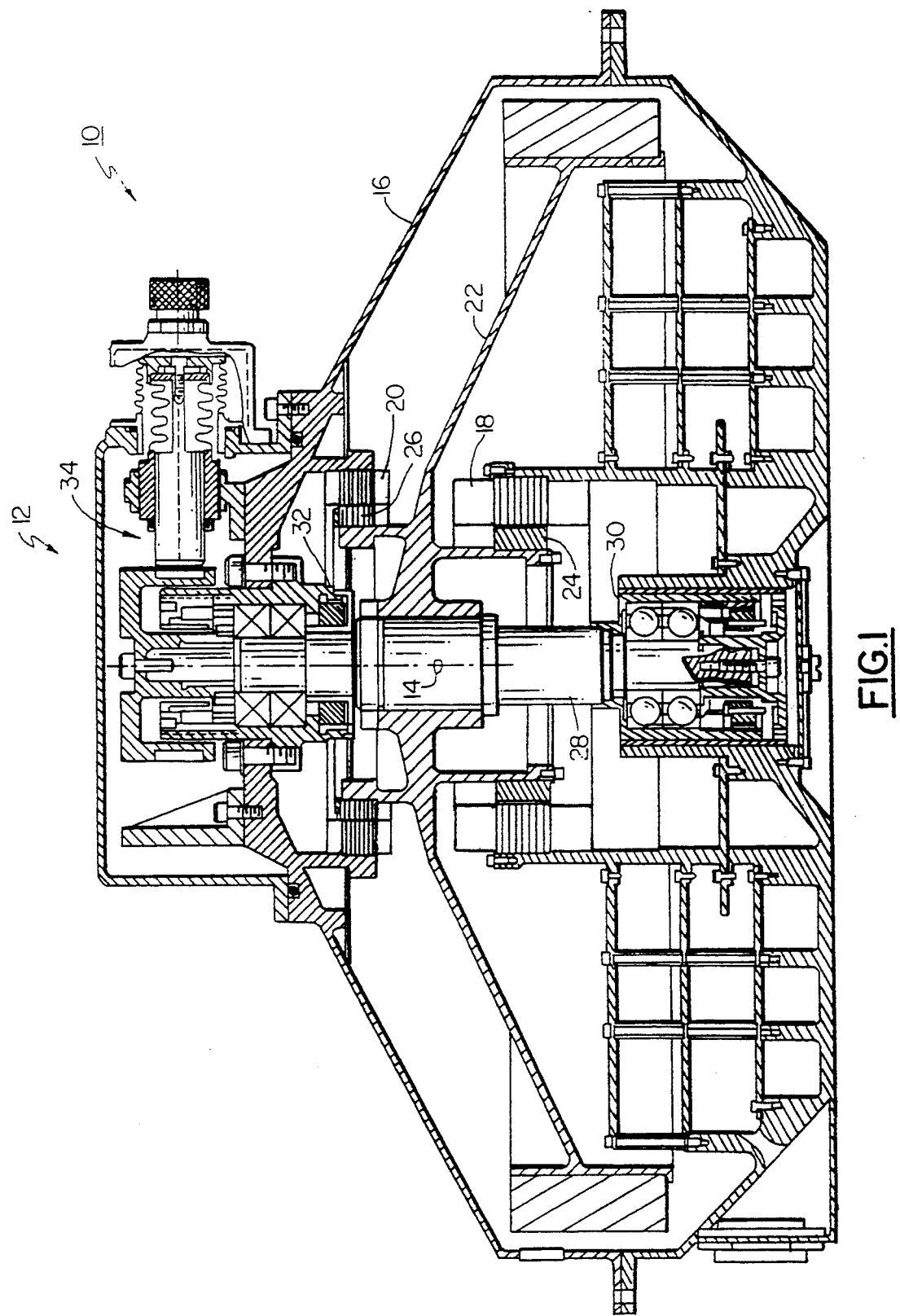
FIG. 1 is a sectional view of a spacecraft component according to the present invention.

As shown in FIG. 1, a spacecraft component or reaction wheel 10 is provided. Component 10 includes a bearing assembly 12 which has an axis 14, a stator or housing 16 which has lower and upper coil units 18, 20, an inertia wheel 22 which has lower and upper magnet units 24, 26, and a shaft 28 on which bearing assembly 12 is mounted.

Bearing assembly 12 has a floating lower dual race bearing cartridge 30 and has a fixed upper dual race bearing cartridge 32, and has a snubber assembly 34. Lower cartridge 30 is a conventional cartridge.

Figure 2:
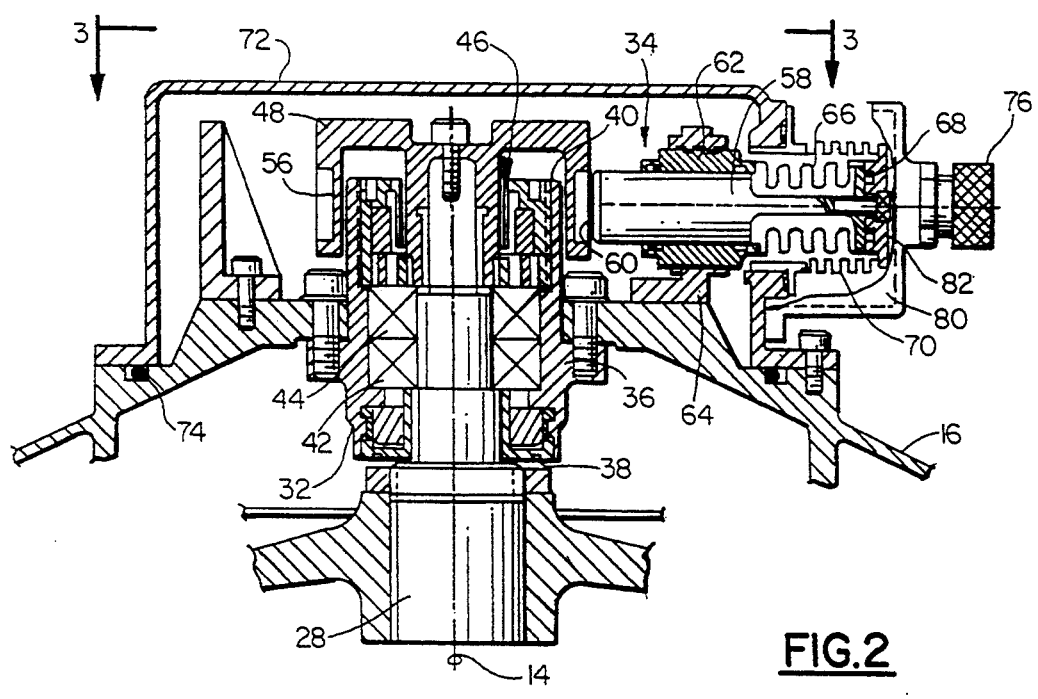
FIG. 2 is an enlarged view of a portion of FIG. 1.

As shown more clearly in FIG. 2, upper cartridge 32 has a peripheral wall 36, a bottom end wall 38 which is connected to peripheral wall 36, and a top end wall 40 which is connected to peripheral wall 36. Upper cartridge 32 also has a bottom ring bearing 42, and has a top ring bearing 44 which are disposed between shaft 28 and peripheral wall 36.

Figure 3:
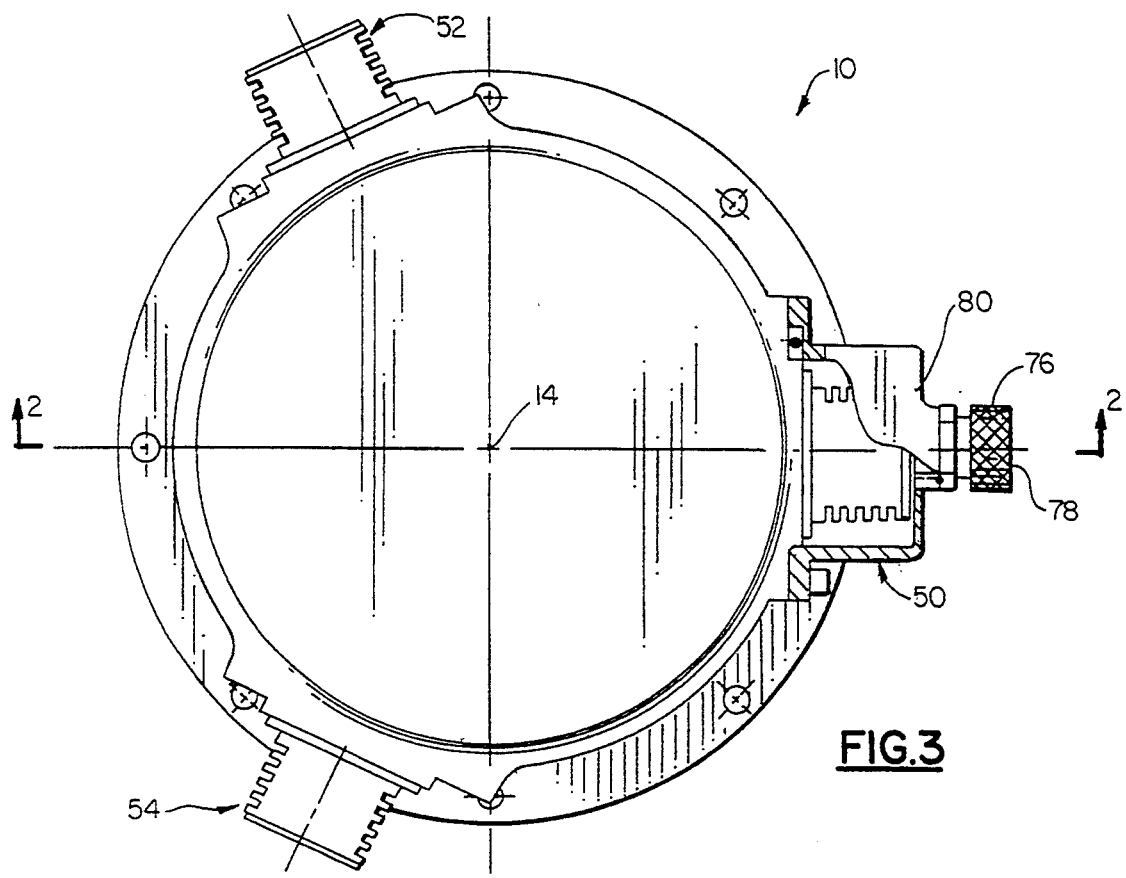
FIG. 3 is a plan section view as taken along the line 3—3 of FIG. 2.

Snubber assembly 34 has a snubber rotor 48 which is fixedly connected to shaft 28, and, as shown in FIG. 3, has three snubber units 50, 52, 54. Snubber rotor 48 has an annular snubber recessed surface 56. Snubber units 50, 52, 54 are spaced apart at a 120 degree spacing.

Snubber unit 50 which is a typical unit and which is identical to units 52, 54, has an actuator piston 58 that has a snubber face 60, and has an actuator housing 62 which slidably supports piston 58, and has a housing support 64. Snubber unit 50 also has an inner bellows 66 of cylindrical shape which connects to housing 62, and has an end plate 68 which connects to inner bellows 66. Snubber unit 50 also has an outer or exterior bellows 70 of cylindrical shape which has one end connected to a cover 72 and its other end connected to end plate 68 for actuation of piston 58. The end plate 68 is connected to piston 58. The cover 72 is connected to stator 16 and has a seal ring 74 disposed therebetween. Snubber unit 50 has a check valve 76 which has an axial evacuation port 78, and has a valve housing 80 which is mounted on cover 72. Piston 58 and check valve 76 are separated by a clearance 82.

In operation, outer bellows 70 which is a standard electro-formed bellows is exposed on the exterior thereof to ambient pressure and is exposed on the interior thereof to a vacuum. Bellows 70 actuates piston 58. Piston face 60 engages the annular rotor surface 56 at the three equispaced circumferential locations of snubber units 50, 52, 54. Snubber rotor 48, which protrudes through labyrinth seal 46 at the end of fixed cartridge 32, is hard mounted to the shaft 28. Inner bellows 66 and outer bellows 70 are electron beam welded to their mating parts to form a hermetic seal therewith. Actuator housing 62 and support 64 form a guide through which the piston 58 travels. In this embodiment, the actuator travel is about 65 thousandths of an inch under the available pressure differential.

In this embodiment, the upper fixed bearing 32 exhibits several thousands of an inch of deflection when loaded to 80 percent of its rated capacity. The maximum piston-to-snubber annulus clearance, determined from a tolerance stack-up, is less than this bearing deflection, to ensure that the snubber piston 58 bears lead prior to the bearing 32 reaching 80 percent of its capacity. Additional axial lead, past the point that snubbing is achieved, is then shared as a parallel lead path between bearing 32 and snubber piston 58. The first parallel lead path passes from shaft 28, then through ring bearings 42, 44, then through to stator 16. The second parallel lead path passes from shaft 28, then through snubber rotor 48, then through piston 58, housing 62 and support 64 of each of the snubber units 50, 52, 54, and then through to stator 16. Snubber rotor 48 and snubber piston 58 are made of the same material in order to provide similar thermal properties.

It is feasible that the ascent pressure could decrease rapidly enough to cause disengagement prior to attenuation or lessening of vibration levels. To assure that disengagement does not occur prior to booster burn-out, a check valve housing 80 forms an enclosure around the inner bellows 66 and outer bellows 70. The crack pressure of check valve 76 is set to the appropriate pressure such that venting of the valve housing 80, causing actuator disengagement, occurs subsequent to vibration level roll-off. In addition, valve 76 with its evacuation port 78, allows housing 80 to be evacuated to assure actuator disengagement during ground test.

The advantages of component 10 are indicated hereafter.

A) Snubber assembly 34 passively reduces vibration amplitude of the inertial wheel 22 and shaft 28 and bearing cartridges 30, 32, thus reducing thrust loads.

B) Snubber assembly 34 does not require a power source for operation.

C) Snubber assembly 34 can be used on various types of components, such as a position gyroscope, or a control moment gyroscope, or a component with a reaction wheel unit.

D) Snubber assembly 34 does not create debris within the component 10, such as the pyrotechnic debris created by the prior art pyrotechnic actuated snubber unit.

E) Snubber assembly 34 is activated by normal launch environment conditions.

F) Component 10 has greater reliability than the prior art component having a pyrotechnic actuated snubber assembly.

While the invention has been described in its preferred embodiment, it is to be understood that the words which have been used are words of description rather than limitation and that changes may be made within the purview of the appended claims without departing from the true scope and spirit of the invention in its broader aspects.

For example, for a component with a relatively small diameter bearings which have significantly less deflection when loaded to capacity, a compliant mount for the fixed cartridge 32 attachment to housing 16 can be used. This allows touchdown of the piston 58 to be achieved without loading the bearings. The compliant mount can be a wave spring configuration or an elastomer pad spacer.

As another example, in place of the inner bellows 66, another type of piston actuator can be used, such as, a solenoid unit, or a stopper motor, or the like.

The embodiments of an invention in which an exclusive property or right is claimed are defined as follows:

1. A spacecraft component comprising:
 a stator having an elongate axis;
 a first bearing cartridge supported by the stator;
 a second bearing cartridge axially spaced from the first bearing cartridge and supported by the stator;
 a shaft supported by the first and second bearing cartridges for shaft rotation;
 an inertia wheel supported by the shaft; and
 a snubber unit having a piston with a piston face for engaging the shaft and having a piston actuator,
 wherein the piston actuator has an actuator housing slidably supporting the piston and has a bellows means for displacing the piston relative to the shaft in a radial direction.

2. The component of claim 1, wherein the bellows means has an inner bellows connected at a radially inner end to the piston support, and has an end wall connecting to a radially outer end of the inner bellows, and has a cover joined to the stator with a cover opening through which the inner bellows passes, and has an outer bellows connected at a radially inner end to the cover and connected at a radially outer end to the piston support.

3. The component of claim 2, wherein the shaft has a rotor having a radially outer surface engaged by the snubber piston face, and wherein the first bearing cartridge is a dual race floating cartridge and the second bearing cartridge is a dual race fixed cartridge, and wherein the fixed cartridge has a labyrinth seal disposed adjacent to the snubber unit.

4. The component of claim 3, wherein the cover has a valve housing having a check valve with an evacuation port for maintaining ground pressure within the housing and on the inner bellows and for maintaining piston face contact with the rotor radially outer surface until launch completion.

5. A spacecraft component comprising:
 a stator having an elongate axis;
 a first bearing cartridge supported by the stator;
 a second bearing cartridge axially spaced from the first bearing cartridge and supported by the stator;
 a shaft supported by the first and second bearing cartridges for shaft rotation;
 an inertia wheel supported by the shaft; and
 a snubber unit having a piston with a piston face for engaging the shaft and having a piston actuator,
 including a second snubber unit and a third snubber unit each peripherally spaced at a 120 degree spacing from the snubber unit and each being identical in structure to the snubber unit.

6. A method of absorbing vibration overload on a spacecraft component wheel assembly shaft during launch including the steps of:
 providing a fixed bearing unit mounted on a stator of the spacecraft component and journaled on a stator shaft coaxially along a common axis;
 providing a snubber piston slidably mounted on the stator and in engagement with the rotor shaft;
 providing a cover disposed over the fixed bearing unit and snubber piston and joined to the stator;
 providing a bellows unit mounted on the cover over an opening in the cover and subject to a pressure differential between inner and outer sides of the cover;
 affixing the piston at its radially outer end to the bellows unit;
 whereby the decreased pressure on the outer side of the cover and bellows after launch withdraws the piston away from the stator shaft allowing rotation of the rotor shaft relative to the stator and withdrawing support by the piston of the rotor shaft.

* * * * *